(12) United States Patent
Gonsowski et al.

(10) Patent No.: US 9,038,592 B2
(45) Date of Patent: May 26, 2015

(54) CYLINDER HEAD COMPRISING A SHROUD

(71) Applicant: Deere & Company, Moline, IL (US)

(72) Inventors: Joseph R Gonsowski, Buckingham, IA (US); Eric J Haaland, Waverly, IA (US); Dan A Warrington, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 30 days.

(21) Appl. No.: 13/863,743

(22) Filed: Apr. 16, 2013

(65) Prior Publication Data

US 2014/0305398 A1 Oct. 16, 2014

(51) Int. Cl.

| F01L 3/00 | (2006.01) |
|---|---|
| F02B 31/00 | (2006.01) |
| F02F 3/00 | (2006.01) |
| F02F 1/42 | (2006.01) |
| F02B 31/04 | (2006.01) |
| F01L 3/20 | (2006.01) |
| F01L 3/08 | (2006.01) |
| F01L 3/06 | (2006.01) |
| F01L 3/02 | (2006.01) |

(52) U.S. Cl.
CPC ............... *F02F 1/4235* (2013.01); *F02B 31/04* (2013.01); *F01L 3/20* (2013.01); *F02F 1/4214* (2013.01); *F01L 3/08* (2013.01); *F01L 3/06* (2013.01); *F02B 31/00* (2013.01); *F01L 3/00* (2013.01); *F01L 3/02* (2013.01)

(58) Field of Classification Search
CPC .......... F02B 31/06; F02B 31/00; F02B 31/04; F02B 3/06; F02B 2075/025; F02B 2275/22; F02F 2001/245; F02F 1/4214; F02F 1/38; F05C 2201/021; F01L 3/02; F01L 3/20; F01L 1/28; F01L 3/06; F01L 3/08; F01L 3/22
USPC ............. 123/306, 193.5, 193.4, 188.2, 188.7, 123/188.8
See application file for complete search history.

(56) References Cited

U.S. PATENT DOCUMENTS

| 1,866,703 | A | * | 7/1932 | Gehres | 123/306 |
| 4,224,918 | A | * | 9/1980 | Tanaka et al. | 123/657 |
| 4,938,213 | A |   | 7/1990 | Tanahashi et al. | |
| 4,974,566 | A | * | 12/1990 | LoRusso et al. | 123/308 |
| 2011/0146620 | A1 |   | 6/2011 | Kaneko | |

FOREIGN PATENT DOCUMENTS

| EP | 0541080 B1 | 6/1995 |
| JP | 4054216 A | 2/1992 |
| JP | 4112904 A | 4/1992 |

(Continued)

*Primary Examiner* — Lindsay Low
*Assistant Examiner* — Syed O Hasan

(57) ABSTRACT

Disclosed is an engine that comprises an engine block, and the engine block comprises a cylinder. The engine further comprises a cylinder head mounted to the engine block, and the cylinder head comprises an intake valve seat and a shroud. Further yet, the engine comprises a combustion chamber formed at least partially by the cylinder and the cylinder head. The intake valve is configured to travel between a fully closed position seated against the intake valve seat and an opened position displaced from the intake valve seat, thus allowing intake flow through the intake valve seat into the combustion chamber. The shroud only partially surrounds a periphery of the valve and extends along at least a portion of the travel of the intake valve so as to restrict intake flow along only a portion of the intake valve.

19 Claims, 4 Drawing Sheets

(56) References Cited

FOREIGN PATENT DOCUMENTS

| JP | 4116223 A | 4/1992 |
| JP | 4124424 A | 4/1992 |
| JP | 5113120 A | 5/1993 |
| JP | 5163905 A | 6/1993 |
| JP | 5163906 A | 6/1993 |
| JP | 5179905 A | 7/1993 |
| JP | 5263647 A | 10/1993 |
| JP | 6346739 A | 12/1994 |

* cited by examiner

CYLINDER HEAD COMPRISING A SHROUD

FIELD OF THE DISCLOSURE

The present disclosure relates to a cylinder head comprising a shroud.

BACKGROUND OF THE DISCLOSURE

As the cost of diesel engines continues to increase, some engine manufacturers are recognizing an opportunity, in certain applications, to transition away from more expensive diesel engines and towards less expensive spark ignition engines. Spark ignition (SI) engines are sometimes less expensive than diesel engines, because they utilize relatively affordable aftertreatment solutions (e.g., three way catalyst), yet they perform in certain applications just as well as diesel engines.

The ability of an SI engine to approach diesel engine performance resides, at least in part, with combustion system efficiency, which may be largely a function of the in-cylinder charge motion (e.g., tumble) prior to the time of combustion. Without high tumble, there may be poor fuel and air homogeneity; a low total kinetic energy at the time of combustion; slow burn rates; and engine knock, which requires later combustion phasing resulting in poor efficiency. In contrast, a high tumble combustion system can deliver faster and more efficient combustion. High tumble in-cylinder flow is possible when the intake air flow enters the combustion chamber with adequate intensity and focus such that a strong barrel shape flow develops in-cylinder. Then, as the piston travels up, the barrel becomes compressed until finally collapsing into individual areas of turbulent vortices of high kinetic energy, thus creating a desirable combustion environment. Known high tumble SI engines often have complex, expensive cylinder head, intake manifold, and valvetrain designs.

SUMMARY OF THE DISCLOSURE

Disclosed is an engine that comprises an engine block, and the engine block comprises a cylinder. The engine comprises a cylinder head mounted to the engine block, and the cylinder head comprises an intake valve seat and a shroud. Further yet, the engine comprises a combustion chamber formed at least partially by the combination of the cylinder and the cylinder head. The intake valve is configured to travel between a fully closed position seated against the intake valve seat, and an opened position displaced from the intake valve seat, thus allowing intake flow through the intake valve seat and into the combustion chamber. The shroud only partially surrounds the intake valve and extends along at least a portion of the travel of the intake valve so as to restrict intake flow along only the portion of the intake valve.

Through the use of the shroud, the intake flow is encouraged to travel over a far side of the intake valve as opposed to both the far side and a near side. Such a targeted flow makes high tumble in-cylinder flow a possibility without resorting to complex cylinder head and valve train designs. The shroud may promote tumble numbers of 1.5 or greater, and sometimes even 3.0 or greater (as measured by Laser Doppler Velocimetry or Particle Image Velocimetry).

BRIEF DESCRIPTION OF THE DRAWINGS

The detailed description of the drawings refers to the accompanying figures in which.

DETAILED DESCRIPTION OF THE DRAWINGS

Figure 1:
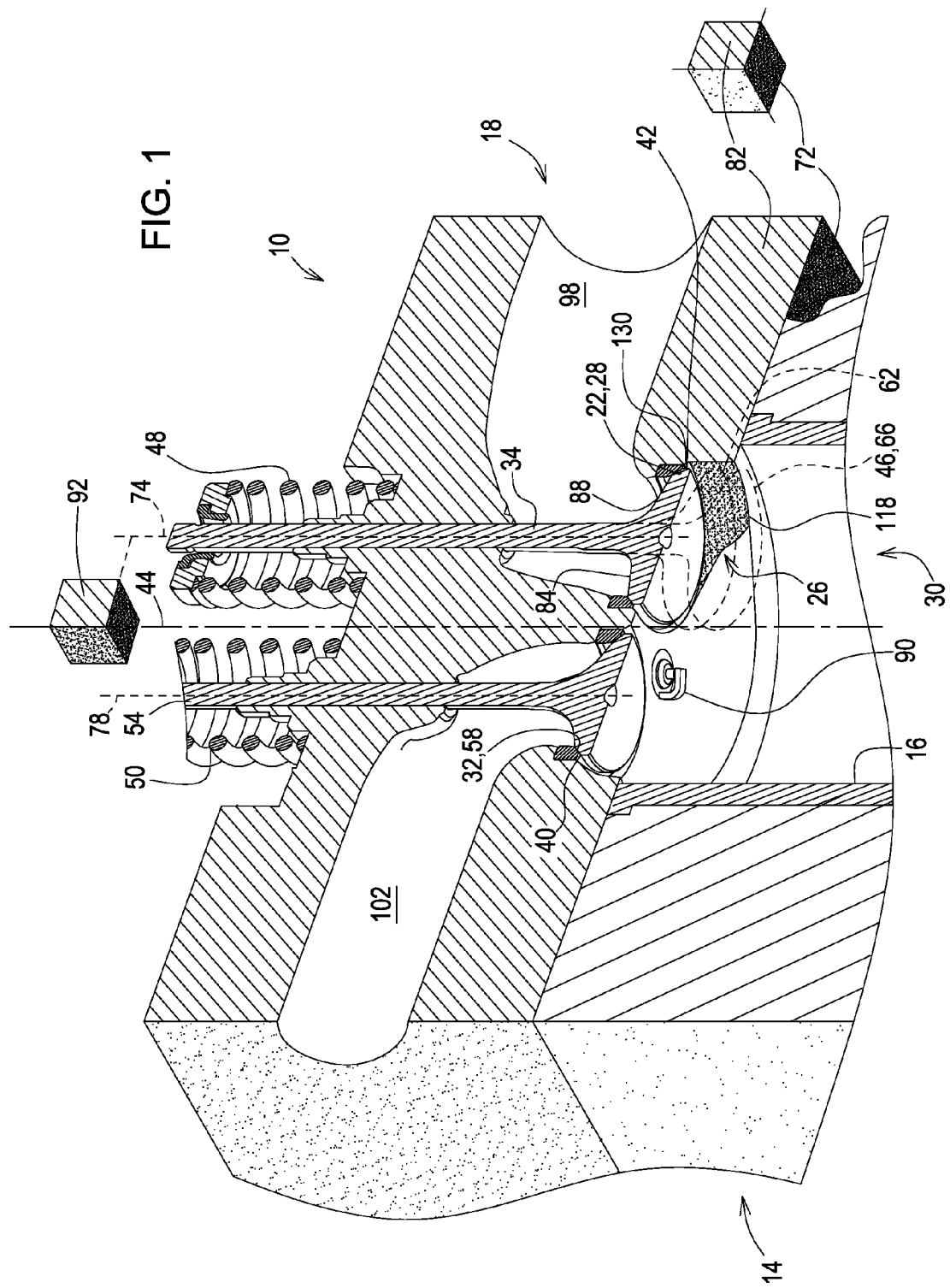
FIG. 1 is a sectional view of an engine comprising a shroud and an intake valve, the intake valve being shown in phantom in a fully opened position, in phantom in a middle position, and in solid in a fully closed position.
Figure 2:
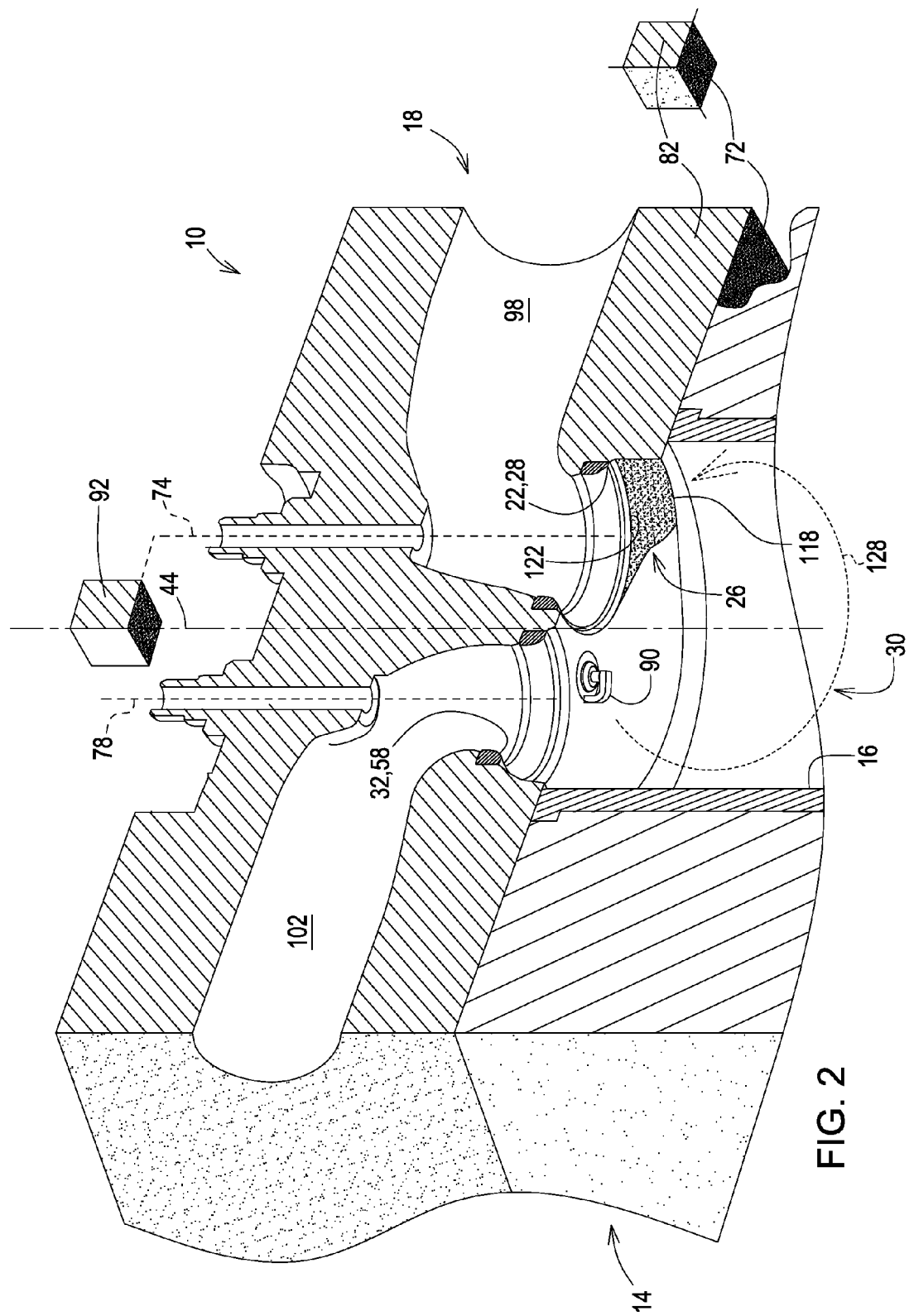
FIG. 2 is an enlarged view of FIG. 1, but the intake valve is not being shown so as to more effectively illustrate the shroud.

Referring to FIGS. 1-4, there is shown an engine 10 comprising an engine block 14 and a cylinder head 18, the cylinder head 18 being mounted to the engine block 14. The engine 10 may be used for providing power to a variety of machines, including on-highway trucks, construction vehicles, marine vessels, stationary generators, automobiles, agricultural vehicles, and recreation vehicles. The engine 10 may be of any size, with any number cylinders, and in any configuration (e.g., "V," inline, and radial).

The engine block 14 comprises a cylinder 16. In the illustrated embodiment, the cylinder 16 is formed by a sleeve, but in other embodiments, the cylinder 16 may be sleeveless (i.e., it is formed and/or machined directly into the engine block 14). The cylinder head 18 may comprise an intake valve seat 22 and a shroud 26. Further yet, the engine 10 comprises a combustion chamber 30 that is formed at least partially by the engine block 14 and the cylinder head 18. There may be a gasket (not shown) sandwiched between the engine block 14 and the cylinder head 18. The engine block 14 and the cylinder head 18 may be made of, for example, iron.

As shown in the illustrated embodiment, the cylinder head 18 may comprise two valves per combustion chamber 30, one of which is an intake valve 34 and other of which is an exhaust valve 54. Other embodiments of the cylinder head 18, however, may comprise any number of intake and exhaust valves.

As shown, the intake valve seat 22 may be the only intake valve seat of the cylinder head 18 that opens into the combustion chamber 30. As further shown, in some embodiments, it may be advantageous to have just a single intake valve seat 22 in contrast to a potentially more expensive, more complex design having multiple intake valve seats. The intake valve 34 is configured to travel between a fully closed position 42 seated against the intake valve seat 22 and an opened position 46 displaced from the intake valve seat 22, thus allowing intake flow through the intake valve seat 22 and into the combustion chamber 30. An intake valve spring 48 may surround the intake valve 34. In some embodiments, as shown in FIG. 1, the intake valve seat 22 may be in the form of an intake valve seat insert 28. However, in other embodiments, the intake valve seat 22 may be formed and/or machined directly into the cylinder head 18.

The shroud 26 only partially surrounds the intake valve 34 and extends along at least a portion of the travel of the intake valve 34 so as to restrict intake flow along only a portion of the intake valve 34. By using the shroud 26, at least some of the intake flow is forced to travel, into the combustion chamber 30, over a far side 84 of the intake valve 34, in contrast to the intake flow being allowed to travel over a near side 88. As the intake flow travels over the far side 84, rather than the near side 88, it tumbles, in the direction of arrow 128 (see FIG. 2), in the combustion chamber 30 and forms a high tumble in-cylinder flow. The shroud 26 may be scalable so as be effective on small, medium, and large engines.

The engine 10 further comprises an exhaust valve 54, and the cylinder head 18 further comprises an exhaust valve seat 58. The exhaust valve 54 is configured to travel between a fully closed position 40 seated against the exhaust valve seat 58 and an opened position (not shown) displaced from the exhaust valve seat 58, allowing exhaust flow out of the combustion chamber 30 and out of the exhaust valve seat 58. The exhaust valve 54 may seat against an exhaust valve seat insert 32 when the exhaust valve 54 is in the fully closed position 40. An exhaust valve guide (not shown) and an exhaust valve spring 50 may surround the exhaust valve 54. As shown the illustrated embodiment, the exhaust valve seat 58 may be the only exhaust valve seat of the cylinder head 18 that opens into the combustion chamber 30, but in other embodiments there may be multiple exhaust valve seats. Exemplarily, in one embodiment, the engine 10 may comprise a plurality of pushrods (not shown) operated by a plurality of cams (not shown) for opening and closing the intake valve 34 and exhaust valve 54 at specific times, though other embodiments of the engine 10 may be camless engines.

Figure 4:
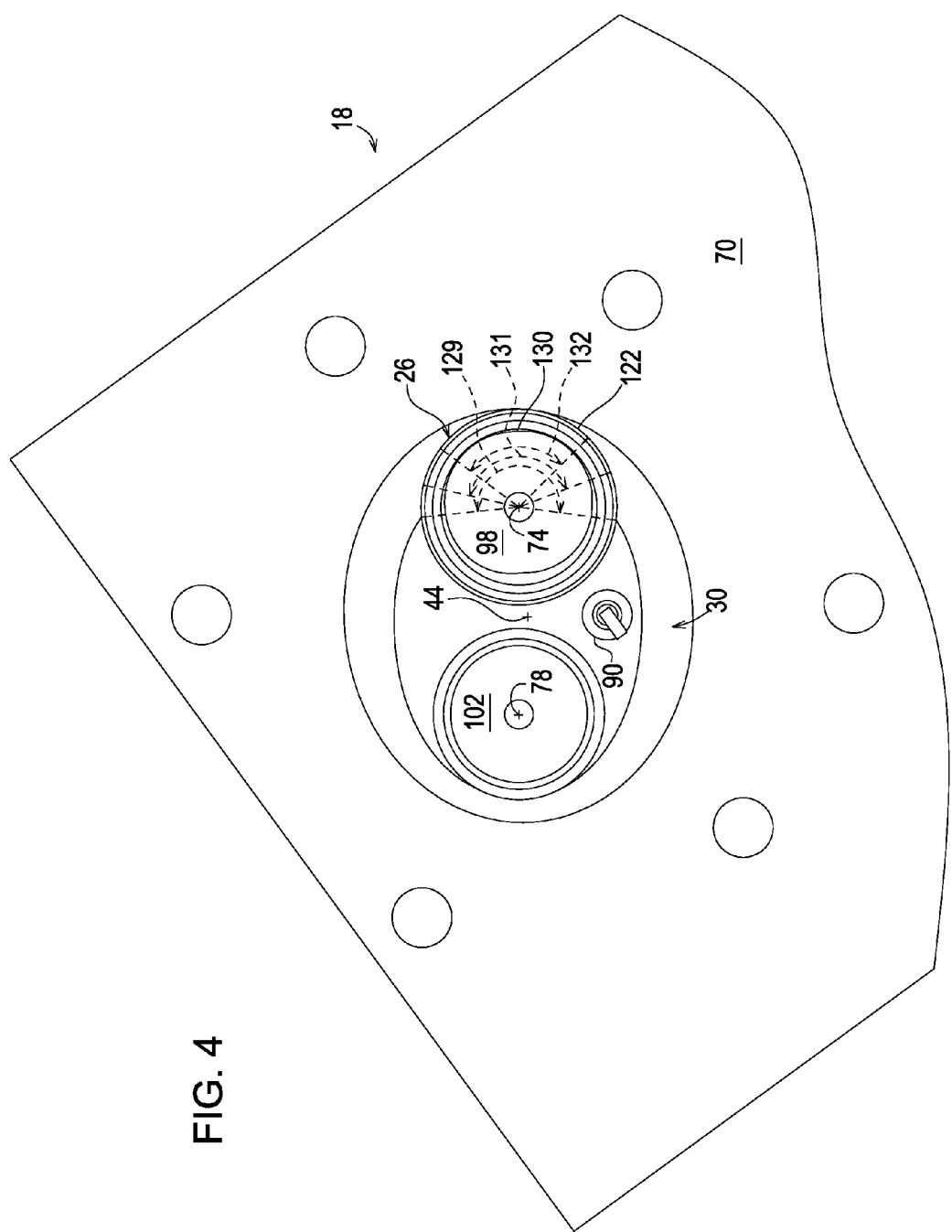
FIG. 4 is an enlarged elevational view showing the shroud.

When the intake valve 34 is in the fully closed position 42 (see FIG. 1), the shroud 26 may surround between 45° and 220° of the intake valve 34. For example, as shown in FIG. 4, the angle 129 may be 194°. Then, when the intake valve 34 is in a middle position 62 (see FIG. 1), between a fully opened position 66 and the fully closed position 42, the shroud 26 may surround up to 220° of the intake valve 34, as shown by angle 131 (see FIG. 4). For example, as shown by angle 131 in FIG. 4, the angle 131 may be 146°. Further, when the intake valve 34 is in a fully opened position 66 (see FIG. 1), the shroud 26 may surround up to 220° of the intake valve 34. For example, as shown by angle 132 in FIG. 4, the angle 132 may be 98°. As just described, the shroud 26 may transition and surround a different angle of the intake valve 34 at the fully closed position 42, at the middle position 62, and at the fully opened position 66. Such a transition may help the intake flow, flow into the combustion chamber 30. Though the shroud 26 may be designed such that it fits within the aforementioned ranges, it may also be designed outside of these ranges, depending on the specific tumble number desired within the combustion chamber 30.

The intake valve 34 travels between a fully closed position 42 and the fully opened position 66. In some embodiments, the shroud 26 may extend along half of the distance between the fully closed position 42 and the fully opened position 66. In other embodiments, the shroud 26 may extend along the entire distance between the fully closed position 42 and the fully opened position 66. In some embodiments, the intake valve 34 may have an intake valve travel between, for example, 8 mm and 12 mm between the fully closed position 42 and the fully opened position 66. Although the shroud 26, in the illustrated embodiment, is shown as a machined surface, it may also be in a separate insert (not shown) that is positioned in the cylinder head 18.

The cylinder head 18 comprises a block mounting face 70 (see FIG. 4) that defines an imaginary plane 72 (see FIGS. 1 and 2), and the intake valve 34 defines an intake axis 74. The block mounting face 70 is the face that faces, and couples with, the engine block 14 and, typically, at least partially defines the combustion chamber 30. The imaginary plane 72 and the intake axis 74, as shown by angle 116 in FIG. 3, may be substantially perpendicular to one another. The exhaust valve 54 defines an exhaust axis 78, and the imaginary plane 72 and the exhaust axis 78 may also be substantially perpendicular relative to one another. Positioning the intake valve 34 substantially perpendicular to the block mounting face 70 may promote high tumble in-cylinder flow and favorable combustion characteristics. As used in this disclosure, substantially perpendicular means plus or minus 12°. The cylinder 16 defines a cylinder axis 44. The intake axis 74 and exhaust axis 78 may form an imaginary plane 82, and the intake axis 74 and the cylinder axis 44 may form an imaginary plane 92. The shroud 26 may be substantially symmetric relative to the imaginary plane 92. It is understood that—in some embodiments of the engine 10—the intake axis 74, the exhaust axis 78, and the cylinder axis 44 may not form a plane. For example, in some embodiments, the intake axis 74 and the exhaust axis 78 may not be positioned 180° relative to one another about the cylinder axis 44, as viewed from the perspective shown in FIG. 4. Further, in some embodiments, the shroud 26 may be concentric to the intake valve 34, although in some other embodiments, it may not be concentric.

The engine 10 may be configured to operate only below a speed of approximately 4000 revolutions per minute, may have a rated speed of between 1600 and 3600 revolutions per minute (e.g., SI engines in work machines), and may have a compression ratio of approximately of 9:1 and even as high as, for example, 12.5:1. The engine 10 may not operate sufficiently well to be commercially feasible above 4000 revolutions per minute, because the engine 10 may not receive a sufficient amount of intake flow at such speeds. As illustrated, the engine 10 may be cooled via a plurality of water passages (not shown), or it may be cooled alternatively with, or in conjunction with, air. Exemplarily, the engine 10 may comprise a spark plug 90 positioned in the cylinder head 18, and also a port injector or a direct injector may be positioned in the cylinder head 18. The spark plug 90 is configured to provide an ignition site within the combustion chamber 30. In some embodiments, the engine 10 may comprise one or more additional spark plugs for additional ignition sites.

The engine 10 may comprise an intake port 98 positioned so as to open into the intake valve seat 22 and configured to provide the intake flow during an intake stroke of the engine 10. Additionally, the engine 10 may further comprise an exhaust port 102 positioned so as to open into the exhaust valve seat 58 and configured to allow the exhaust flow, during an exhaust stroke of the engine 10, to flow out of the combustion chamber 30. The intake port 98 and the exhaust port 102 may be formed into the cylinder head 18.

Figure 3:
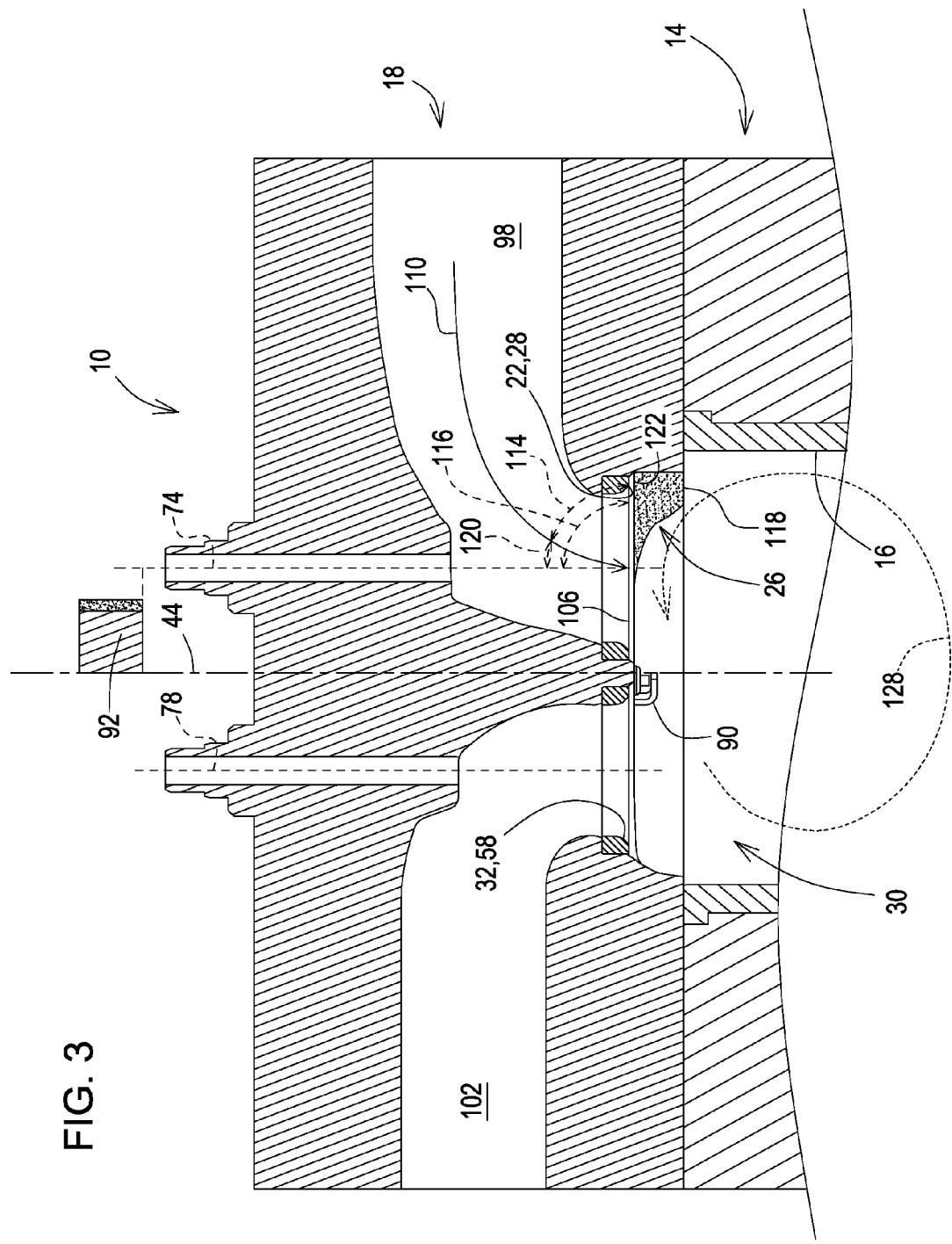
FIG. 3 is an elevational view of FIG. 2 showing the shroud.

The intersection of the intake port 98 with a plane through the valve seat 22 may define an imaginary port plane 106, while the intake port 98 may define a central axis 110. As shown in FIG. 3, the imaginary port plane 106 and the central axis 110 may form an angle 114. The angle 114 intersects the intake valve seat 22 and is between approximately 65° and 80°, though alternative embodiments may be outside of this range. In the embodiment shown, the angle 114 is around 70°. The angle 114 and the angle 116 cooperate to define an angle 120 therebetween, the angle 120 being relatively large so as to encourage high tumble in-cylinder flow. For example, the angle 120 in the illustrated embodiment is around 20°. Such an intake port 98 in combination with the shroud 26 may result in the engine 10 having impressive tumble values, even though it may have just two valves—the intake valve 34 and the exhaust valve 54—in the combustion chamber 30.

As shown in the illustrated embodiment, the shroud 26 may comprise a first edge 118 positioned so as to intersect the block mounting face 70, and the first edge 118 may surround partially a portion of the intake valve 34 when the intake valve 34 is in the fully opened position 66. In other embodiments, the shroud 26 may not extend to such an extent that the first edge 118 intersects the block mounting face 70. Additionally, the shroud 26 may also comprise a second edge 122 positioned on the opposite ends of the shroud 26 relative to the first edge 118, and further positioned so as to surround partially the portion of the intake valve 34 in the fully closed position 42. The second edge 122 may surround partially a circumference of the intake valve 34 that is greater than the first edge 118.

In some embodiments, a gap 130 may be positioned between the shroud 26 and the intake valve 34. The gap 130 may allow the intake valve 34 to move freely between the fully closed position 42 and the fully opened position 66. In a light duty engine, for example, the gap 130 may be 3 mm or less and even 0.5 mm or less. In medium duty engines, the gap 130 may be, for example, 7.5 mm or less. In heavy duty engines, the gap 130 may be, for example, even larger yet so as to account for larger part dimensions and part tolerances and, additionally, increased intake flow.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. An engine, comprising:
    an engine block comprising a cylinder;
    a cylinder head mounted to the engine block, the cylinder head comprising an intake valve seat and a shroud and a block mounting face, the shroud comprising an edge;
    a combustion chamber formed at least partially by the cylinder and the cylinder head, the intake valve seat configured to allow an intake flow into the combustion chamber; and
    an intake valve, the intake valve configured to travel between a fully closed position seated against the intake valve seat and an opened position displaced from the intake valve seat allowing the intake flow through the intake valve seat and into the combustion chamber;
    wherein the shroud only partially surrounds the intake valve and extends along at least a portion of the travel of the intake valve so as to restrict the intake flow along only a portion of the intake valve, and the edge intersects the block mounting face.

2. The engine of claim 1, further comprising an exhaust valve, the cylinder head comprising an exhaust valve seat, the exhaust valve positioned on the exhaust valve seat, and the exhaust valve configured to travel between a fully closed position seated against the exhaust valve seat and an opened position displaced from the exhaust valve seat allowing exhaust flow out of the combustion chamber and through the exhaust valve seat.

3. The engine of claim 1, wherein, when the intake valve is in a fully opened position, the shroud surrounds up to 220° of the intake valve.

4. The engine of claim 1, wherein, when the intake valve is in a fully opened position, the shroud surrounds up to 150° of the intake valve.

5. The engine of claim 1, wherein, when the intake valve is in a middle position between a fully opened position and the fully closed position, the shroud surrounds up to 220° of the intake valve.

6. The engine of claim 1, wherein, when the intake valve is in a middle position between a fully opened position and the fully closed position, the shroud surrounds up to 180° of the intake valve.

7. The engine of claim 1, wherein, when the intake valve is in the fully closed position, the shroud surrounds between 45° and 220° of the intake valve.

8. The engine of claim 1, wherein the intake valve travels between a fully opened position and the fully closed position, and the shroud extends along at least half of a distance between the fully opened position and the fully closed position.

9. The engine of claim 1, wherein the intake valve travels between a fully opened position and the fully closed position, and the shroud extends along a distance between the fully opened position and the fully closed position.

10. The engine of claim 1, wherein the cylinder head comprises a block mounting face that defines an imaginary plane, the intake valve defines an intake axis, and the imaginary plane and the intake axis are substantially perpendicular relative to one another.

11. The engine of claim 1, wherein the intake valve defines an intake axis and the cylinder defines a cylinder axis, the intake axis and the cylinder axis form an imaginary plane, and the shroud is substantially symmetric relative to the imaginary plane.

12. The engine of claim 1, wherein the engine is configured to operate only below a speed of 4000 revolutions per minute.

13. The engine of claim 1, wherein the engine has a rated speed between 1600 revolutions per minute and 3600 revolutions per minute.

14. The engine of claim 1, wherein the engine comprises a spark plug positioned in the cylinder head and configured to provide an ignition site within the combustion chamber.

15. The engine of claim 1, further comprising an intake port positioned so as to open into the intake valve seat and configured to provide the intake flow, the intake valve seat defining an imaginary port plane, the intake port defining a central axis, and the imaginary port plane and the central axis forming an angle, the angle intersects the intake valve seat and is between 65° and 80°.

16. The engine of claim 1, wherein a gap is positioned between the shroud and the intake valve.

17. The engine of claim 1, wherein the intake valve seat is the only intake valve seat of the cylinder head that opens into the combustion chamber.

18. The engine of claim 1, wherein the shroud comprises an edge, and the edge surrounds partially the intake valve when the intake valve is in a fully opened position.

19. The engine of claim 18, wherein the edge is a first edge, the shroud comprises a second edge, the second edge surrounds partially the intake valve when the intake valve is in the fully closed position, and the first edge and the second edge are on opposite ends of one another.

* * * * *